United States Patent

Brainard et al.

[15] 3,647,017
[45] Mar. 7, 1972

[54] ELECTRONIC CRUISE CONTROL SYSTEM

[72] Inventors: Norman R. Brainard; William H. Holl, both of Flint, Mich.

[73] Assignee: General Motors Corporation, Detroit, Mich.

[22] Filed: Sept. 11, 1969

[21] Appl. No.: 857,133

[52] U.S. Cl. .............................................180/105, 123/105
[51] Int. Cl. ...........................................................B60k 31/00
[58] Field of Search ...........................................180/105–109; 123/102, 103, 122; 324/161

[56] References Cited

UNITED STATES PATENTS

| | | | |
|---|---|---|---|
| 3,476,205 | 11/1969 | Kato | 123/102 X |
| 3,480,859 | 11/1969 | Fichter | 317/5 X |
| 3,392,799 | 7/1968 | Ishikawa | 180/105 |

*Primary Examiner*—Arthur L. La Point
*Assistant Examiner*—George H. Libman
*Attorney*—Jean L. Carpenter and Paul Fitzpatrick

[57] ABSTRACT

An electronic cruise control system having an electric torque motor whose output shaft tracks vehicle speed. A pneumatic pressure controller supplies a controlled pressure to a pneumatic power unit which in turn controls the position of a vehicle throttle. A clutch has one member attached for rotation with the torque motor output shaft and another member attached to a pneumatic valve. The clutch members are coupled together by a solenoid energized through a momentary switch such that any deviations of the torque motor output shaft position will control the pneumatic valve which in turn controls the pressure input to the power unit so as to position the vehicle throttle to provide for vehicle cruise control.

5 Claims, 4 Drawing Figures

INVENTORS
Norman R. Brainard
BY & William H. Holl
Paul Fitzpatrick
ATTORNEY

INVENTORS
Norman R. Brainard
BY & William H. Holl
Paul Fitzpatrick
ATTORNEY 3,647,017

ELECTRONIC CRUISE CONTROL SYSTEM

This invention relates to an electronic cruise control system to control the speed of a moving vehicle at a speed selected by the operator of the vehicle.

A number of vehicle cruise controls have been proposed which require a flexible shaft or other rotating member to be connected to the transducer from a rotating member of the vehicle. It is one object of this invention to provide for an electronic cruise control system which eliminates the flexible shaft connection between a rotating member of the vehicle and the cruise control system.

Also a number of cruise controls have been proposed which require the vehicle operator to manually set a controlled reference to be compared with the vehicle speed to provide vehicle cruise control. Another object of this invention is to provide for an electronic cruise control system in which the speed controller tracks the vehicle speed.

Another object of this invention is to provide for an electronic cruise control system whereby a clutch is engaged at the speed to which the vehicle is to be controlled.

Another object of this invention is to provide for an electronic cruise control system in which the pneumatic pressure controller drive unit is an electric torque motor.

In the preferred embodiment of this invention, a sender comprising a rotating magnet and a magnetically sensitive reed switch, sends pulses to a pulse-shaping network at a frequency corresponding to vehicle speed. The pulse-shaping network shapes these pulses which are then amplified by an amplifier and feedback network. The output of the amplifier is a current whose average magnitude corresponds to vehicle speed. This current is the input to a torque motor which positions its output shaft to a position corresponding to the value of the torque motor input and therefore the vehicle speed. A clutch has two members, one of which is attached to the torque motor output shaft and the other of which is attached to a pneumatic valve such that rotation of the clutch member controls the pneumatic valve to supply a controlled pressure to a pneumatic power unit. A mode solenoid is provided such that when energized, the clutch members are coupled together and vehicle manifold vacuum is routed to the pneumatic valve. The controlled pressure input to the pneumatic power unit positions the vehicle throttle to provide for vehicle cruise control.

IN THE DRAWINGS

Figure 1:
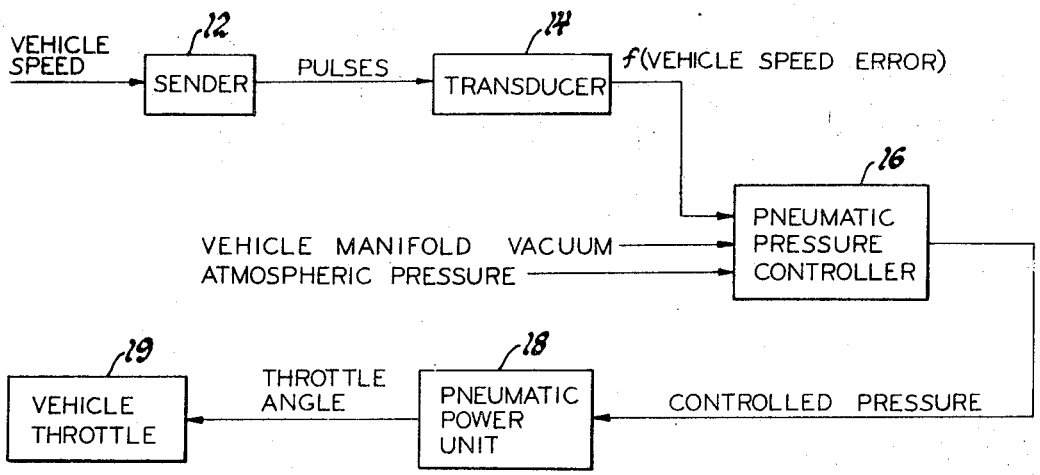
FIG. 1 is a block diagram of an electronic cruise control system incorporating the principles of the invention.

Referring to FIG. 1, a sender 12 senses and converts vehicle speed into a series of pulses having a frequency corresponding to the vehicle speed. A transducer 14 utilizes these pulsed to control a pneumatic pressure controller 16. The pneumatic pressure controller 16 has two additional inputs which are vehicle manifold vacuum and atmospheric air. The control input to the pneumatic pressure controller 16 from the transducer 14 is a function of the vehicle speed error and controls the mixture of the atmospheric air and the vehicle manifold vacuum to supply a controlled pressure to a pneumatic power unit 18 which controls a vehicle throttle 19 to control the vehicle speed.

Figure 2:
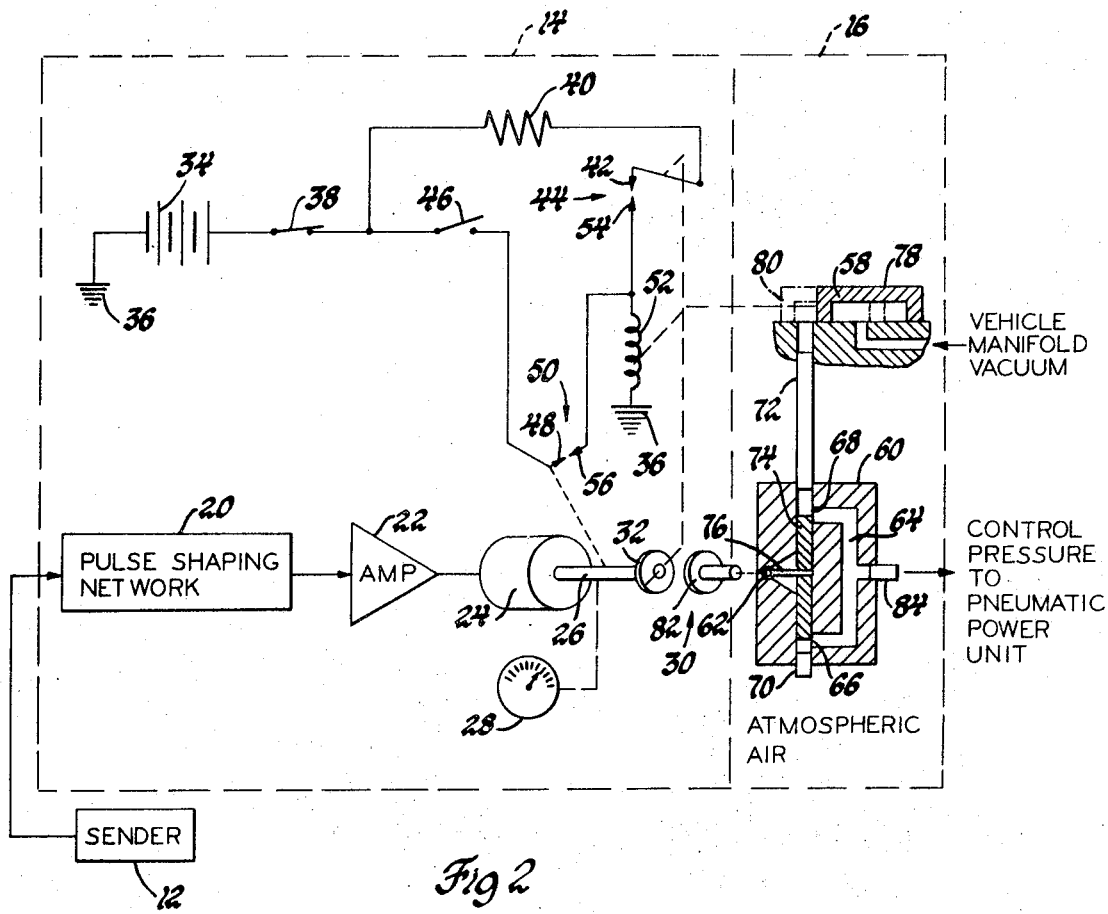
FIG. 2 is a schematic diagram of the electronic cruise control system transducer and pneumatic pressure controller of FIG. 1.

Referring to FIG. 2, the transducer 14 receives an input from the sender 12 which consists of pulses, the frequency of which corresponds to the vehicle speed. These pulses are shaped by a pulse-shaping network 20 which generates pulses having the same frequency as the pulse output from the sender 12. These pulses constitute the input to an amplifier 22 the output of which is a current whose average magnitude is directly proportional to the vehicle speed. This current is the input to a torque motor 24 having an output shaft 26. Since the input to the torque motor 24 is directly proportional to the vehicle speed, the output shaft 26 will assume a position directly proportional to the vehicle speed. An indicator 28 is suitably connected to the output shaft 26 for rotation therewith and is suitably calibrated to indicate vehicle speed. A clutch 30 has a member 32 attached to the output shaft 26 for rotation therewith. Therefore, the clutch member 32 tracks the vehicle speed with the output shaft 26. A source of electric power 34 which may be, for example the vehicle battery is connected between a ground 36 and a normally closed disengage switch 38. The normally closed disengage switch 38 is connected to the vehicle braking system so as to be opened when the vehicle brakes are actuated. A current-limiting resistor 40 is connected between the normally closed disengage switch 38 and a contact 42 of a switch 44. A manually operable normally open engage switch 46 is connected between the normally closed disengage switch 38 and a contact 48 of a low-speed inhibit switch 50. One side of a mode solenoid 52 is connected to a contact 54 of the switch 44 and to a contact 56 of the low-speed inhibit switch 50. The other side of the mode solenoid 52 is connected to the ground 36. The contact 48 of the low-speed inhibit switch 50 is suitably secured to the output shaft 26 of the torque motor 24 to be rotated thereby. The contacts 48 and 56 of the low-speed inhibit switch 50 are arranged so as to close upon the vehicle obtaining a minimum speed as represented by a specific position of the output shaft 26 and to thereafter remain closed at higher vehicle speeds. The mode solenoid 52 is energized by the vehicle operator momentarily depressing the normally open engage switch 46 to a closed position and thereby completing a circuit to the mode solenoid through the contacts 48 and 56 of the low-speed inhibit switch 50. It can be seen therefore that the mode solenoid 52 cannot be energized until the vehicle has reached the speed at which the output shaft 26 rotates to close the contacts 48 and 56 of the low-speed inhibit switch 50. This is a precaution to prevent vehicle engine runaway when the vehicle operator attempts to activate the cruise control system when the vehicle is in neutral or reverse gear. When the mode solenoid is energized, the contacts 42 and 54 of the switch 44 close to complete a circuit through the current-limiting resistor 40 to maintain the solenoid in an energized condition when the normally open engage switch 46 is returned to its open position. The mode solenoid 52 is deenergized by the actuation of the vehicle brakes which will open the normally closed disengage switch 38 to open the circuit from the source of electric power 34.

The pneumatic pressure controller 16 is comprised of a switching valve 58 and a pneumatic valve 60 having an input shaft 62. The pneumatic valve 60 is comprised of a mixing chamber 64 having an input orifice 66, an input orifice 68, a conduit 70 through which atmospheric air is admitted to the orifice 66, a conduit 72 through which either atmospheric air or vehicle mainfold vacuum is admitted to the orifice 68 and a mixing valve 74. The mixing valve 74 is suitably housed within the pneumatic valve 60 so as to have freedom of movement in two directions such that movement in the first direction increases the area of the orifice 66 and decreases the area of the orifice 68 and movement in the second direction increases the area of the orifice 68 and decreases the area of the orifice 66. An arm 76 is suitably secured to the input shaft 62 for rotation therewith and is suitably secured to the center of the mixing valve 74 such that arcual movements of the arm 76 result in linear movements of the mixing valve 74. The switching valve 58 has a solid line position 78 and a broken line position 80. When the switching valve is in the position 78, the vehicle manifold vacuum is closed off and atmospheric air is admitted to the pneumatic valve 60 through the conduit 72, and when the switching valve 58 is in the position 80, vehicle manifold vacuum is admitted to the pneumatic valve 60 through the conduit 72.

A member 82 of the clutch 30 is suitably secured to the input shaft 62. The clutch 30 and the switching valve 58 are suitably connected to the mode solenoid 52 so as to be controlled thereby such that when the mode solenoid 52 is energized, the clutch members 32 and 82 are coupled together so as to couple the output shaft 26 of the torque motor 24 to the input shaft 62 of the pneumatic valve 60 and the switching valve 58 is placed in the position 80 to admit vehicle manifold vacuum to the pneumatic valve 60 through the conduit 72 and when the mode solenoid 52 is deenergized, the clutch members 32 and 82 are uncoupled and the switching valve 58 is placed in the position 78 so as to block off vehicle manifold vacuum and admit atmospheric air to the pneumatic valve 60 through the conduit 72. Therefore, when the mode solenoid is deenergized, the inputs to the mixing chamber 64 through the orifices 66 and 68 are atmospheric pressures and the output of the pneumatic pressure controller through a conduit 84 is atmospheric pressure and when the mode solenoid 52 is energized, the inputs to the mixing chamber 64 is atmospheric air as limited by the orifice 66 and vehicle manifold vacuum as limited by the orifice 68 and the output of the pneumatic pressure controller 16 through the conduit 84 is a controlled pressure which is a function of the respective areas of the orifices 66 and 68 as controlled by the mixing valve 74 which in turn is controlled by the rotation of the input shaft 62 in response to deviations of the position of the output shaft 26 representing the desired cruise speed.

Figure 3:
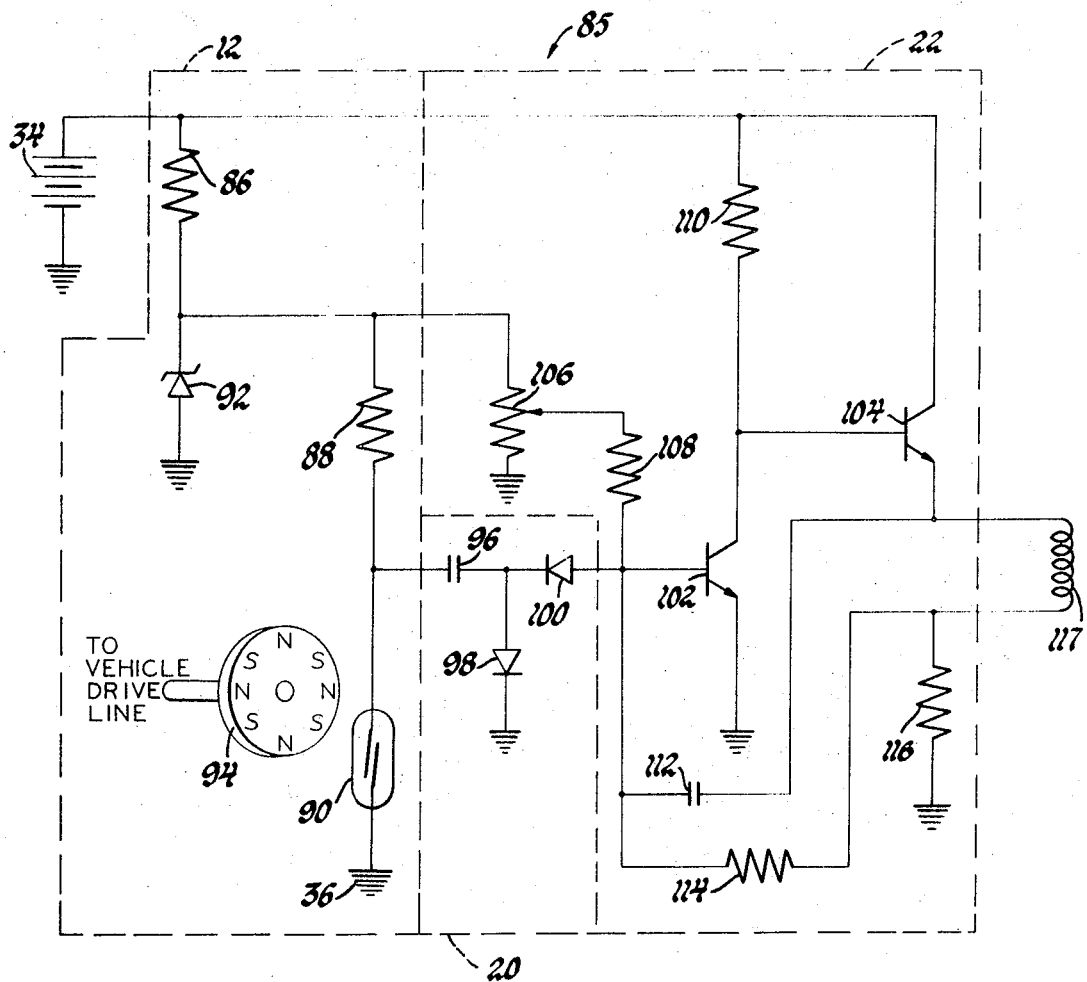
FIG. 3 is a schematic diagram of the sender of FIG. 1 and the pulse-shaping network and amplifier of FIG. 2.

Referring to FIG. 3, a vehicle speed responsive means 85 is comprised of the sender 12, the pulse shaper 20 and the amplifier 22. The sender 12 is comprised of a resistor 86, a resistor 88, a magnetically sensitive reed switch 90, a Zener diode 92 and a magnet 94. The resistors 86 and 88 and the magnetically sensitive reed switch 90 are in series with the source of electric power 34 and the ground 36. The Zener diode 92 is connected in parallel with the resistor 88 and the magnetically sensitive reed switch 90 to provide for voltage regulation. The magnet 94 is suitably coupled to the vehicle drive line which may be, for example, a powered wheel for rotation therewith. The magnet 94 is a face charged disc and is placed in close proximity to the magnetically sensitive reed switch 90. As the vehicle drive line rotates, thereby rotating the magnet 94, the magnetic field intensity in the vicinity of the magnetically sensitive reed switch 90 increases to a maximum which is sufficient to close the magnetically sensitive reed switch 90 and alternately decreases to a minimum to open the magnetically sensitive reed switch 90 to produce a square wave output, the frequency of which is directly proportional to the rotation of the vehicle front wheel and therefore the vehicle speed.

The output of the sender 12 is fed to the pulse-shaping network 20 which is comprised of a capacitor 96, a diode 98, and a diode 100. When the magnetically sensitive reed switch 90 is open, the capacitor 96 charges from the source of electric power 34 through the resistors 86 and 88 and the diode 98 to the ground 36. When the magnetically sensitive reed switch 90 is closed, the capacitor 96 discharges through the diode 100 and the magnetically sensitive reed switch 90 to the ground 36. The output of the pulse-shaping network 20 is a series of unidirectional pulses having a frequency corresponding to the frequency of the square wave output of the sender 12.

The output pulses of the pulse-shaping network 20 are fed to the amplifier 22 which is comprised of a transistor 102, a transistor 104, a potentiometer 106, a resistor 108, a load resistor 110, a feedback capacitor 112, and feedback resistors 114 and 116. The potentiometer 106 and the resistor 108 are utilized for system calibration. The output of the amplifier 22 is a current whose average magnitude is directly proportional to the frequency of the input to the amplifier 22. This current is the input to a coil 117 of the torque motor 24. The feedback capacitor 112 filters out the AC components of the current output of the amplifier 22 and the feedback resistors 114 and 116 provide temperature compensation.

Figure 4:
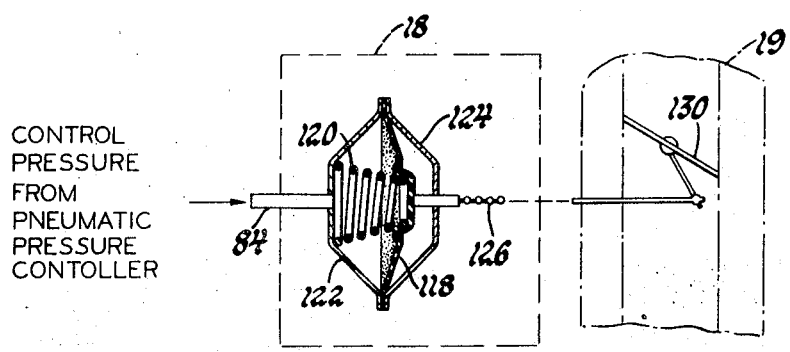
FIG. 4 shows a pneumatic power unit utilized in the electronic cruise control system.

Referring to FIG. 4, the pneumatic power unit 18 is comprised of a bellows 118, a spring 120, an end plate 122 and an end plate 124. The bellows 118 and the end plate 122 are forcibly separated by the spring 120. A linkage 126 suitably connects the bellows 118 to a conventional carburetor throttle valve 130 in the engine air induction passage which is spring biased to the closed position such that movement of the bellows 118 against the force of the spring 120 causes a corresponding movement of the carburetor throttle valve 130. When the vehicle speed is being controlled, the input to the pneumatic power unit 18 is a controlled pressure from the pneumatic pressure controller through the conduit 84. A controlled pressure from the pneumatic pressure controller 16 which is less than atmospheric pressure will cause the bellows 118 to move against the force of the spring 120 to position the carburetor throttle valve 130.

In operation, as the operator increases the vehicle speed, the magnet 94 is rotated by the vehicle drive line thereby periodically opening and closing the magnetically sensitive reed switch 90 at a frequency proportional to the vehicle speed. The output of the sender 12 is shaped by the pulse-shaping network 20 whose output is fed to the amplifier 22. The output of the amplifier 22 is a current whose average magnitude corresponds to the vehicle speed. This current is fed to the torque motor 24 whose output shaft 26 rotates, thereby rotating the clutch member 32 and the indicator 28 to a position representing the vehicle speed sensed by the sender 12. When the operator of the vehicle desires to activate the electronic cruise control system, the normally open engage switch 46 is momentarily closed to energize the mode solenoid 52. If the vehicle speed has exceeded the minimum speed at which the contacts 48 and 56 of the low-speed inhibit switch 50 are closed, the mode solenoid 52 will be energized, thereby closing the contacts 42 and 54 of the switch 44, coupling the clutch members 32 and 82 of the clutch 30 so as to couple the output shaft 26 of the torque motor 24 to the input shaft 62 of the pneumatic valve 60 and to position the switching valve 58 into the position 80 so as to admit vehicle manifold vacuum to the pneumatic valve 60. As the normally open engage switch 46 is returned to its open position, the mode solenoid 52 is maintained in an energized condition by the current through the current-limiting resistor 40 and the contacts 42 and 54 of the switch 44. As the vehicle speed increases or decreases as a result of changing road conditions or wind velocity, this change in speed is sensed by the vehicle speed responsive means 85 to cause the output shaft 26 of the torque motor 24 to rotate correspondingly. The rotation of the output shaft 26 of the torque motor 24 rotates the input shaft 62 of the pneumatic valve 60 so as to arcuately move the arm 76 to linearly move the mixing valve 74. As the vehicle speed decreases, the mixing valve 74 is moved to increase the area of the orifice 66 and decrease the area of the orifice 68. The net pressure in the mixing chamber 64 decreases due to a decrease in atmospheric air input through the orifice 66 and an increase in vacuum input through the orifice 68 to send a decreased controlled pressure to the pneumatic power unit 18 through the conduit 84. This decreased controlled pressure in the pneumatic power unit 18 moves the bellows 118 against the force of the spring 120 to open the carburetor throttle valve 130 by means of the linkage 126 so as to increase the vehicle speed to the desired cruise speed. As the vehicle speed increases the mixing valve 74 is moved to decrease the area of the orifice 68 and increase the area of the orifice 66. This has the effect of increasing the net pressure in the mixing chamber 64 due to a decrease in vacuum input through the orifice 68 and an increase in atmospheric air input through the orifice 66 to send an increase in controlled pressure output to the pneumatic power unit 18 through the conduit 84 so as to allow the spring 120 to move the bellows 118 so as to allow the carburetor throttle valve 130 to close thereby decreasing the vehicle speed to the desired cruise speed. When it is desired to disable the electronic cruise control system the operator actuates the braking system of the vehicle to open the normally closed disengage switch 38 thereby deenergizing the mode solenoid 52. When the mode solenoid 52 is deenergized the clutch members 32 and 82 of the clutch 30 are decoupled thereby decoupling the input shaft 62 of the pneumatic valve 60 from the output shaft 26 of the torque motor 24, the contacts 42 and 54 of the switch 44 are opened and the switching valve 58 is returned to the position 78 to close off the vehicle manifold vacuum and to admit atmospheric pressure to the pneumatic valve 60 through the conduit 72.

What has been described is an electronic cruise control system which eliminates the requirement of a flexible shaft connection between a rotating member of the vehicle to the cruise system which utilizes a torque motor whose output shaft tracks the vehicle speed and which only requires the operator to actuate a switch to initiate cruise control.

What is claimed is:

1. In an electronic cruise control system for a throttle-controlled vehicle, the combination of an electric torque motor having an output shaft, vehicle speed responsive means sensing vehicle speed and supplying a signal corresponding to vehicle speed to the electric torque motor, the torque motor being responsive thereto for rotating the output shaft to a position corresponding to vehicle speed, power means for positioning the vehicle throttle, control means coupled to the power means, and selectively operable coupling means for coupling the control means to the electric torque motor output shaft, the control means, when coupled to the output shaft, being responsive to deviations in the electric torque motor output shaft position for causing the power means to position the vehicle throttle to provide for vehicle cruise control.

2. In an electronic cruise control system for a throttle-controlled vehicle, the combination of an electric torque motor having an output shaft, an indicator connected to the output shaft for rotation therewith and suitably calibrated to indicate vehicle speed, vehicle speed responsive means sensing vehicle speed and supplying a signal corresponding to vehicle speed to the electric torque motor, the torque motor being responsive thereto for rotating the output shaft and the indicator to a position whereby the indicator indicates the vehicle speed sensed by the vehicle speed responsive means, power means for positioning the vehicle throttle, control means for the power means, and selectively operable coupling means for coupling the control means to the electric torque motor output shaft, the control means, when coupled to the output shaft, being responsive to deviations in the electric torque motor output shaft position for causing the power means to position the vehicle throttle to provide for vehicle cruise control.

3. In an electronic cruise control system for a throttle-controlled vehicle, the combination of an electric torque motor having an output shaft, vehicle speed responsive means sensing vehicle speed and supplying a signal corresponding to vehicle speed to the electric torque motor, the torque motor being responsive thereto for rotating the output shaft to a position corresponding to vehicle speed, power means for positioning the vehicle throttle, control means for the power means, and selectively operable coupling means including a clutch having a first member connected to the electric torque motor output shaft for rotation therewith and a second member connected to the control means and a selectively operable clutch control means operable to couple the second member to the first member for rotation therewith, the control means, when the first and second members are coupled, being responsive to deviations in the electric torque motor output shaft position for causing the power means to position the vehicle throttle to provide for vehicle cruise control.

4. In an electronic cruise control system for a throttle-controlled vehicle, the combination of an electric torque motor having an output shaft, an indicator connected to the output shaft for rotation therewith and suitably calibrated to indicate vehicle speed, vehicle speed responsive means sensing vehicle speed and supplying a signal corresponding to vehicle speed to the electric torque motor the torque motor being responsive thereto for rotating the output shaft and the indicator to a position whereby the indicator indicates the speed sensed by the vehicle speed responsive means, power means for positioning the vehicle throttle, control means for the power means, and selectively operable coupling means including a clutch having a first member connected to the electric torque motor output shaft for rotation therewith, a second member connected to the control means, and selectively operable clutch control means including a solenoid operable to couple the second member to the first member for rotation therewith, the control means, when the first and second members are coupled, being responsive to deviations in the electric torque motor output shaft position for causing the power means to position the vehicle throttle to provide for vehicle cruise control.

5. In an electronic cruise control system for a throttle-controlled vehicle, the combination of an electric torque motor having an output shaft, an indicator connected to the output shaft for rotation therewith and suitably calibrated to indicate vehicle speed, vehicle speed responsive means including a magnetically sensitive reed switch for sensing vehicle speed and producing electric pulses having a frequency corresponding to vehicle speed, and a pulse shaper and amplifier for supplying a signal corresponding to vehicle speed to the electric torque motor so as to rotate the output shaft and the indicator to a position whereby the indicator indicates the vehicle speed sensed by the magnetically sensitive reed switch, power means including a pneumatic power unit for controlling the vehicle throttle position, control means for the power means including a pneumatic valve means for controlling the pneumatic pressure input to the pneumatic power unit, and selectively operable coupling means including a clutch having a first member connected to the electric torque motor output shaft for rotation therewith and a second member connected to the pneumatic valve means and selectively operable clutch control means including a solenoid operable to couple the second member to the first member for rotation therewith so as to render the pneumatic valve responsive to deviations in the electric torque motor output shaft position to vary the pneumatic pressure input to the pneumatic power unit to cause the pneumatic power unit to position the vehicle throttle for vehicle cruise control.

* * * * *